Figure 1:
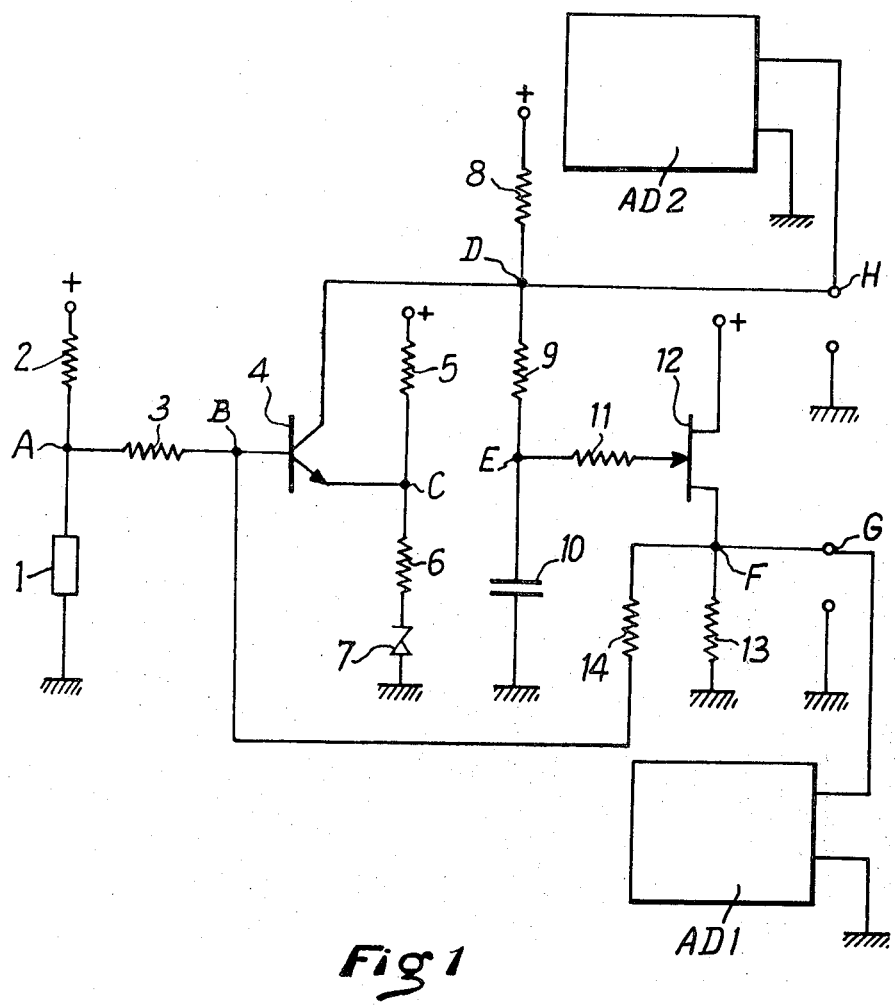

United States Patent [19]
Guilleux

[11] 3,813,565
[45] May 28, 1974

[54] DETECTOR APPARATUS

[76] Inventor: Robert Guilleux, Allee des Tamaris, 92-Plessis-Robinson, France

[22] Filed: Nov. 13, 1972

[21] Appl. No.: 305,680

[30] Foreign Application Priority Data
Nov. 15, 1971 France .............................. 71.40728
Dec. 31, 1971 France .............................. 71.47781

[52] U.S. Cl. ..................... 307/308, 330/28, 330/35
[51] Int. Cl. ............................................. H03k 3/26
[58] Field of Search ............. 330/21, 28, 35; 328/3, 328/4; 307/310, 308

[56] References Cited
UNITED STATES PATENTS
3,296,546  1/1967  Schneider ............................ 330/21
3,501,711  3/1970  Moran ............................. 330/35 X
3,654,468  4/1972  Shah ............................... 330/35 X Primary Examiner—Herman Karl Saalbach
Assistant Examiner—James B. Mullins
Attorney, Agent, or Firm—Pierce, Scheffler & Parker

[57] ABSTRACT

An apparatus for detecting changes in a physical quantity comprises a sensitive element responding to changes in the quantity by varying an electrical potential. An amplifier fed with the varying potential provides an output signal by way of a time-constant circuit to a high input-impedance active device from the output of which negative feedback is taken to the amplifier input. The amplifier output signal is denotive of change in the sensed quantity and the high input impedance active element yields a signal denotive of rate of change of the quantity. The sensitive element may be an ionisation chamber and the active element an FET. The amplifier is a transistor, which may be an FET.

6 Claims, 2 Drawing Figures

DETECTOR APPARATUS

BACKGROUND OF THE INVENTION

This invention relates to an apparatus for detecting variations in the magnitudes of physical quantities and is especially applicable to the detection of temperature changes for purposes of fire detection. The apparatus can alternatively be made sensitive to variations in air pressure or in humidity or to the presence of smoke or dust, for example, or to any other form of pollution.

To detect increases in the ambient temperature it is known to employ a temperature-sensitive resistance element, a conductor or semiconductor of electricity, connected in series with a fixed resistor across a power supply. The junction point of these resistances provides a potential which is applied to a utilisation circuit. This potential varies in response to changes in temperature. A detector of this type is arranged to be triggered when the ambient temperature exceeds a predetermined threshold level.

To detect rapid variations in temperature it is known to employ a similar resistive voltage divider, the junction point of the resistances being connected to one terminal of a capacitor, the other terminal of which is connected to a circuit including a resistance and a forward-biased diode. In response to slow variations in temperature the capacitor charges and discharges slowly, the corresponding current being less than the continuous current flowing through the resistance and the diode. In the case of rapid variations in temperature the capacitor discharge current exceeds the continuous current, cuts off the diode and an alarm circuit is tripped.

It should be noted that each of these known types of detector circuit is a threshold circuit. In point of fact the first trips at a potential threshold corresponding to a predetermined temperature level, the second for a rapid variation in temperature resulting in a discharge current of the capacitor higher than the continuous current through the diode.

SUMMARY OF THE INVENTION

The present invention seeks to provide a novel and simple apparatus for detecting variations in sensed quantities, which detects both a change in the sensed quantity beyond a predetermined value and a rapid variation of the sensed quantity in one sense or the other, with a high sensitivity which remains linear over a large range of temperatures.

The object of the present invention is to provide an arrangement for detecting variations in temperature, of the type including a sensitive element defining an electrical potential.

According to the present invention there is provided apparatus for detecting changes of a sensed quantity, of the type comprising a sensitive element responding to changes in said quantity by varying a potential, including an amplifier fed with said potential, a resistance/-capacitance circuit signal transfer circuit determining a time-constant, a high input-impedance active element fed with the amplifier output signal by way of the time-constant circuit and a negative-feedback circuit connected between the output of the active element and the input of the amplifier, so that changes in said potential are transferred by way of said element to the negative-feedback path with a delay determined by the time-constant circuit.

In a modification of the invention the detector device is modified in that the sensitive element is connected to the base of a first transistor, and that the amplifier is constituted by a second, field-effect transistor, the gate potential of which is determined by the first transistor and by the negative feedback resistor.

Figure 2:
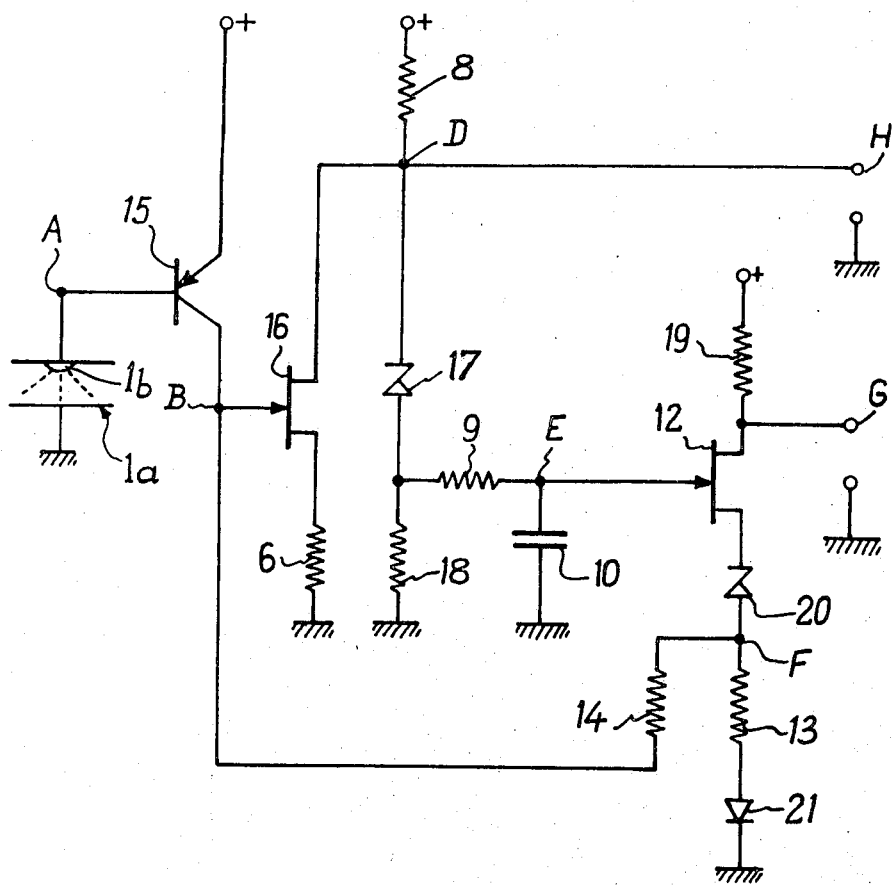

Preferred features and advantages of embodiments of the invention will become apparent from the following description taken in conjunction with the accompanying drawings, of which:

FIG. 1 shows the simplified schematic circuit diagram of a device for detecting variations in temperature; and FIG. 2 is a simplified circuit diagram of an embodiment of a detector device according to the invention using an ionisation chamber as the sensitive element, which may be applied to the detection of pollution.

Referring firstly to FIG. 1 of the drawings, it will be seen that the sensitive element 1 is connected in series with a fixed resistance 2. A direct potential from a voltage source represented only by a "+" terminal and by the ground symbol is applied to the series combination of sensitive element and resistor, which thus constitutes a resistive potential divider. The sensitive element may be constituted by any component capable, under the action of a variation in temperature, of producing a variation in the potential difference between its terminals, for example, a temperature-sensitive resistor or a chain of diodes. The junction point A between the temperature-sensitive element 1 and the resistor 2 is connected, by way of a resistor 3, to the base B of a transistor 4. The emitter of the transistor 4 is connected to the junction point C of a resistive voltage divider formed by two resistors 5 and 6 connected in series with a Zener diode 7, the series assembly of the two resistors and the Zener diode being fed from a power supply represented only by a "+" terminal and the ground symbol. The Zener diode allows a substantial current to flow in the emitter circuit of transistor 4 with little change in the potential at point C. The collector of transistor 4 is connected to the junction point of two resistors 8 and 9, the series combination of these two resistors being itself connected in series with a capacitor 10 across the power supply represented by a "+" terminal and by the ground symbol. The junction point E between the resistor 9 and the capacitor 10 is connected by way of a resistor 11 to the gate of a transistor 12, advantageously a field-effect transistor, as shown. Transistor 12 which has a high input impedance has its main current path connected in series with a resistor 13 across the power supply. The junction point F between transistor 12 and resistor 13 is connected by way of a negative feedback resistor 14 to the base B of transistor 4. The circuit F–14–B constitutes a negative feedback path for the amplification provided essentially by the transistor 4.

The arrangement includes two outputs which may be used separately or together. The first output, terminal G connected to point F in the circuit, provides a signal corresponding to the change in temperature (thermal detector) and may be connected to a threshold detector AD1. The second output, terminal H connected to point D in the circuit, allows the use of a signal corresponding to a rapid change of the temperature in either sense (temperature rate of change detector) and may be connected to a detector device AD2.

The operation of the arrangement is as follows:

At a predetermined temperature, when the circuit arrangement is supplied with d.c. power, current flows through the sensitive element 1 and the two transistors 4 and 12 are conductive. The potential at point D is sufficiently high to be made use of by a utilisation circuit connected to terminal H. After a time interval determined by the time-constant of circuit 9–10, the point E attains the same potential as point D. Since the gate of the transistor 12 is at the same potential, the potential at point F attains a certain positive value. A part of this value, defined by the feedback ratio provided by the negative feedback path F–B is transferred by way of resistor 14 to the base B of transistor 4.

On the assumption that the arrangement is in equilibrium at a predetermined temperature, a change in the temperature results in a variation in a predetermined sense of the potential at point A. The change in potential transmitted to point B by the path F–B is in the opposite sense to the variation of potential at A. In point of fact, if the sensitive element is constituted by diodes, an increase in temperature results in a reduction in the voltage drop across the diodes, that is to say, in a reduction in the potential at point A. The current in the transistor 4 is thus reduced and the potential at point D is increased. After the delay introduced by the time-constant of the circuit 9–10, the potential at point E rises, and likewise the potential at point F. The negative-feedback path F–B then transfers to the base of transistor 4 an increase in potential which, with a certain delay, compensates in part for the initial reduction in the potential at A, and the arrangement operates as a negative feedback amplifier (transistor 4, the feedback being delayed by the circuit 9–10.

The relative values of the components 1,2,3 and 14 determine the negative feedback factor and, as a result, the potential at the point F a function of the temperature of the sensitive element 1. It is therefore possible to make use of the potential at F for detecting the crossing of a predetermined threshold by the sensed temperature. By connecting a known threshold alarm device AD1 to terminal G the combination will operate as a temperature change detector.

On the other hand, for a given variation of the potential at A following upon a change of temperature, there is developed at D a change of potential of the opposite sign, equal to the product of the change in potential at A multiplied by the gain of the amplifier (transistor 4). The potentials at the points E, F and B will follow this change with a delay imposed by the time-constant of the circuit 9–10.

In the case of slow variation of the ambient temperature the change in potential at D will be very small. In the case of a rapid variation of the temperature, on the other hand, the change in potential at D will be significant and if a known alarm device AD2 is connected to terminal H as shown, the combination will function as a rate-of-change of temperature detector.

In the embodiment described above the amplifying device is a simple transistor 4; it is obvious that this could be replaced by any equivalent or more elaborate amplifier device. Likewise, the high input-impedance element 12 has been described as being a field-effect transistor, but this may be replaced by an equivalent arrangement, such as a known high input impedance transistor circuit, without departing from the scope of the invention as defined by the claims.

The embodiment illustrated by FIG. 2 will now be described. In this figure of the drawings the same reference characters as are used in FIG. 1 are employed to denote elements having generally similar function. Here, however, the sensitive element is shown as being an ionisation chamber 1a including a radioactive source 1b. Point A, the ungrounded terminal of the sensitive element, is connected to the base of an n-p-n transistor 15 of which the emitter is connected to the positive power supply terminal "+" and the collector is connected to point B, the input terminal of the amplifier device, which in this case is constituted by a field-effect transistor 16 having its source-drain path connected from point D to ground by way of a resistor 6. In this embodiment point D is again connected to an output terminal H to which may be connected an alarm device for responding to rapid changes, to constitute a rate-of-change detector.

Between point D and ground is connected the series combination of a Zener diode 17 and a resistor 18. This arrangement enables a voltage offset to be present between point D and the ungrounded terminal of resistor 18, while ensuring that any potential change at point D also appears unchanged across resistor 18. The junction between these components is connected to a circuit comprising a resistor 9 and a capacitor 10, constituting a time-constant circuit. The output point E of this time-constant circuit 9–10 is connected to the gate of a further field-effect transistor 12 of which the source-drain path is connected in a circuit including the series combination of a resistor 19, the transistor 12, a Zener diode 20, a resistor 13 and a diode 21, which is connected between the power supply "+" terminal and ground to prevent any transient reverse current flowing to the junction between Zener diode 20 and resistor 13, which constitutes the point F from which negative feedback is taken by way of a resistor 14 to the point B. This arrangement enables a desired voltage offset to be present between field-effect transistor 12 and point F while ensuring that the potential changes at both points are the same. Output terminal G, to which may be connected an alarm device responsive to the crossing of a pollution threshold thus providing threshold detector action, is connected to the junction between transistor 12 and resistor 19.

The operation of this embodiment is similar to that of FIG. 1: in the inactive state a current passes through the ionisation chamber 1a to the base of transistor 15. An amplified current therefore flows in the emitter-collector path of the transistor 15 and through the resistor 14, determining at point B a potential which is applied to the gate of the field-effect transistor 16. The current passing through the source-drain path of transistor 16 determines the potential at point D, which potential may be obtained at terminal H for detecting rapid changes in the current in ionisation chamber 1a due to pollution.

The variations in potential at point D are transmitted to point E through the time-constant circuit provided by resistor 9 and capacitor 10. Such variations are therefore applied with a delay determined by the time-constant of circuit 9–10 to the gate of the second field-effect transistor 12. There thus passes through the source-drain path of this transistor a current which determines the potential at point F, which influences the potential at point B by way of the negative feedback resistor 14. In addition, the potential appearing across resistor 19 is available at point G for detecting the crossing of the pollution threshold.

As an example, if products of combustion enter the ionisation chamber 1a the current flowing in it will diminish, so that the current flowing in the transistor 15 and the resistor 14 will also be reduced, the potential at B will fall as will the current in the first field-effect transistor 16, and the potential at D will rise.

This increase in potential is transmitted to point E with a predetermined delay, which may be as much as 1 hour or more if desired. The current in the second field-effect transistor 12 then increases, raising the potential at point F, and, as a result, that at point B by way of the resistor 14. The change in potential at point G may be employed to trip a threshold detector apparatus.

It should be noted that the embodiment last described uses an ionisation chamber as the sensitive element, but that any sensitive element could be used, especially, for example, a temperature-sensitive resistor, a photoresistor, or a photoelectric or infra-red detector.

It should also be noted that the arrangement responds to variations in either sense: it is therefore a double-action device.

In the described embodiments the sensitive element has been a temperature-responsive device or an ionisation chamber, but the apparatus may equally well be employed with an element sensitive to variations in pressure, humidity or illumination, or for the detection of smoke or dust, provided that a sensitive element appropriate to the requirements is employed.

Apparatus according to the invention enables the provision, using a single detector circuit, of two output potentials, the one at G corresponding to change of the sensed quantity and the other at H to a rate-of-change of the sensed quantity.

I claim:

1. In apparatus for detecting changes of a sensed quantity, of the type comprising a sensitive element responding to changes in said quantity by varying an electrical potential and an amplifier fed at an input thereof with said potential and providing an output signal representative of said charges, the improvement which comprises:
   a resistance/capacitance signal transfer circuit determining a time constant;
   a high input impedance active element having an input and an output;
   means including said signal transfer circuit coupling said amplifier output signal to the input of said active element; and
   negative feedback path means including a resistor coupling the output of the active element to the amplifier input whereby changes in said potential are transferred by way of said signal transfer circuit to said negative feedback path with a delay determined by said time-constant.

2. The improvement claimed in claim 1 wherein the amplifier provides a signal denotive of changes in the sensed quantity and the high input impedance element provides a signal which is a function of the value of the sensed quantity, whereby the apparatus enables the detection of both change of quantity and rate-of-change of quantity.

3. The improvement claimed in claim 1 wherein the amplifier is a transistor and the high-impedance element is a field-effect transistor.

4. The improvement claimed in claim 1 wherein the amplifier includes a field-effect transistor and the sensitive element is connected to the base of a transistor connected in series with said negative-feedback resistor, the potential at the junction of said transistor and resistor being applied to the grid of the field-effect transistor.

5. The improvement claimed in claim 4 wherein the output potential of the amplifier is applied to the resistance/capacitance circuit by way of a Zener diode connected in series with a resistor.

6. In apparatus for detecting changes in the magnitude of a quantity of the kind including a sensitive element determining an electrical potential representative of the quantity and an amplifier formed by a field-effect transistor having an input and an output, and means applying the potential to the transistor input to yield at the transistor output a signal representative of said potential, the improvements which comprises:
   a resistance/capacitance signal transfer circuit defining a time-constant;
   a high-input impedance active element;
   means including said signal transfer circuit coupling said signal to said active element input;
   negative feedback path means including a transistor coupling said active element output to said amplifier input whereby the changes in said potential are transferred by way of the active element to the negative feedback path with a delay determined by said time-constant,
   means coupling said sensitive element to the base of said transistor in said feedback path; and means coupling the potential at the junction point of said transistor and said feedback path to the gate of the field effect transistor, whereby variations in either sense of said quantity may be detected.

* * * * *